United States Patent
Izumida

(10) Patent No.: US 8,075,141 B2
(45) Date of Patent: Dec. 13, 2011

(54) PROJECTOR, MULTI-SCREEN SYSTEM, PROJECTOR CONTROL METHOD, COMPUTER PROGRAM PRODUCT, AND INFORMATION STORAGE MEDIUM

(75) Inventor: Eiji Izumida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/097,378

(22) Filed: Apr. 29, 2011

(65) Prior Publication Data

US 2011/0199546 A1      Aug. 18, 2011

Related U.S. Application Data

(63) Continuation of application No. 12/370,451, filed on Feb. 12, 2009, now Pat. No. 7,954,957.

(30) Foreign Application Priority Data

Feb. 13, 2008   (JP) ................. 2008-031301
Oct. 30, 2008   (JP) ................. 2008-279300

(51) Int. Cl.
     *G03B 21/14*   (2006.01)
(52) U.S. Cl. ............ 353/70; 348/745; 348/806; 345/1.3
(58) Field of Classification Search .............. 353/69, 353/70, 94; 348/745, 806; 345/1.3
     See application file for complete search history.

(56) References Cited

U.S. PATENT DOCUMENTS

| | | | |
|---|---|---|---|
| 6,733,138 B2 | 5/2004 | Raskar |
| 7,237,911 B2 | 7/2007 | Yamada |
| 7,367,681 B2 | 5/2008 | Harboe |
| 2009/0002637 A1 | 1/2009 | Harada |

FOREIGN PATENT DOCUMENTS

| | | |
|---|---|---|
| JP | 8-168039 A | 6/1996 |
| JP | 2000-241879 A | 9/2000 |
| JP | 2006-251604 A | 1/2006 |

OTHER PUBLICATIONS

Notice of Allowance and Notice of Allowability received in U.S. Appl. No. 12/370,451; Feb. 15, 2011.

*Primary Examiner* — William C Dowling
(74) *Attorney, Agent, or Firm* — AdvantEdge Law Group, LLC

(57) ABSTRACT

In at least one embodiment, a projector comprises a projection unit configured to project a video based on a video signal. An image pickup unit is configured to pick up an image of a projection video projected by the projection unit and output the picked-up image. A control unit is configured to determine a projection video projected by an other projector based on the picked-up image received from the image pickup unit. A keystone correction unit is configured to carry out keystone correction of the video signal so that the projection video projected by the projection unit is aligned with the projection video projected by the other projector.

8 Claims, 12 Drawing Sheets

ARRANGEMENT OF PROJECTORS

FRONT VIEW OF SCREEN 200

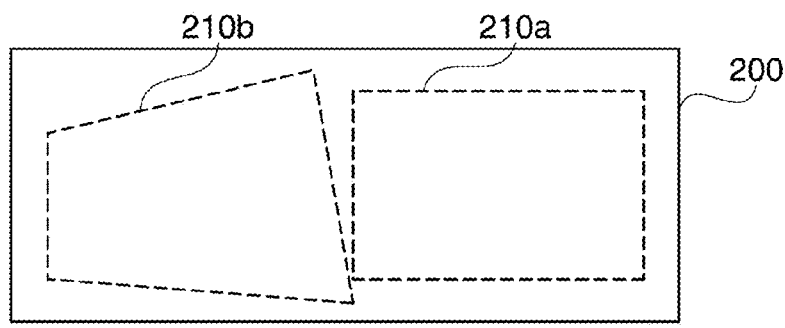
FIG. 3A  BEFORE KEYSTONE CORRECTION
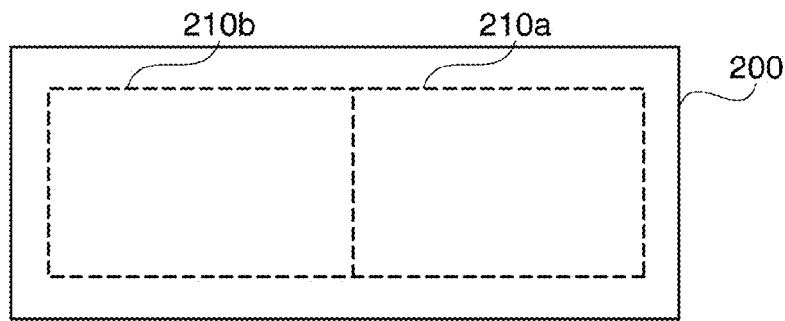
FIG. 3B  AFTER KEYSTONE CORRECTION FIG. 5A BEFORE KEYSTONE CORRECTION
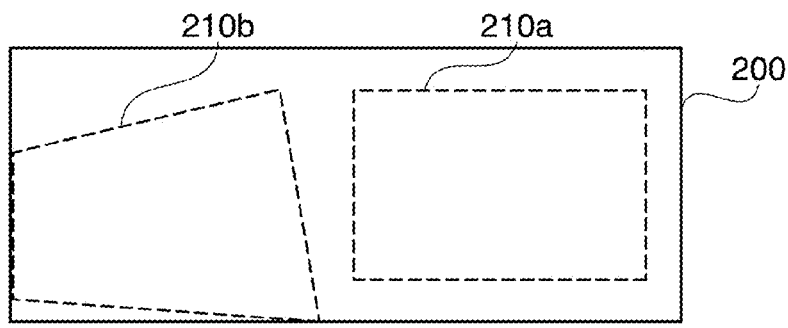
FIG. 5B AFTER KEYSTONE CORRECTION
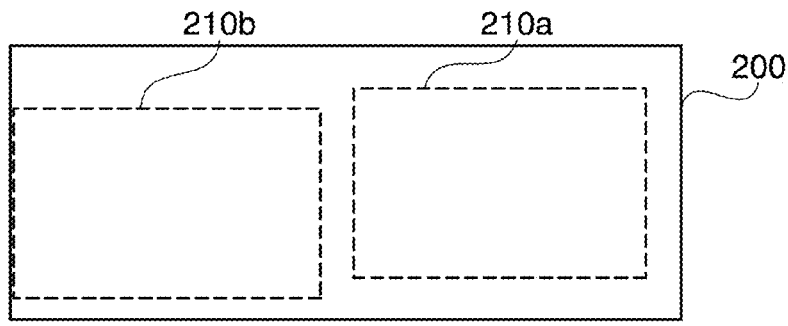
FIG. 5C AFTER LENS SHIFT
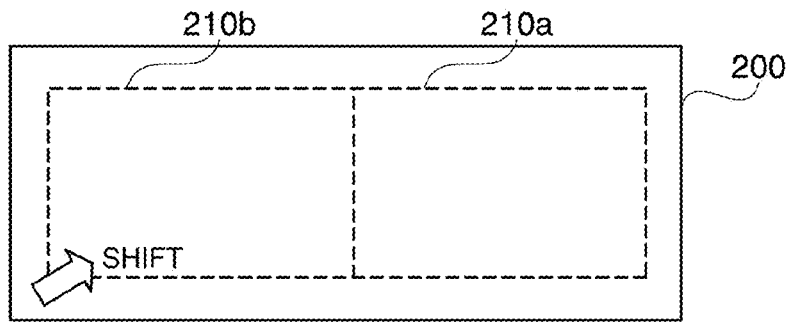

FIG. 7A  BEFORE KEYSTONE CORRECTION
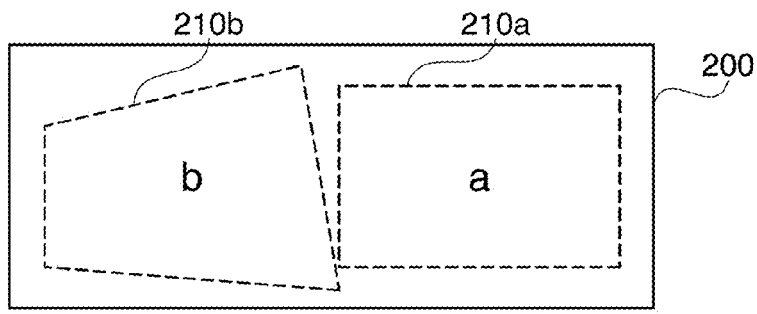
FIG. 7B  AFTER KEYSTONE CORRECTION
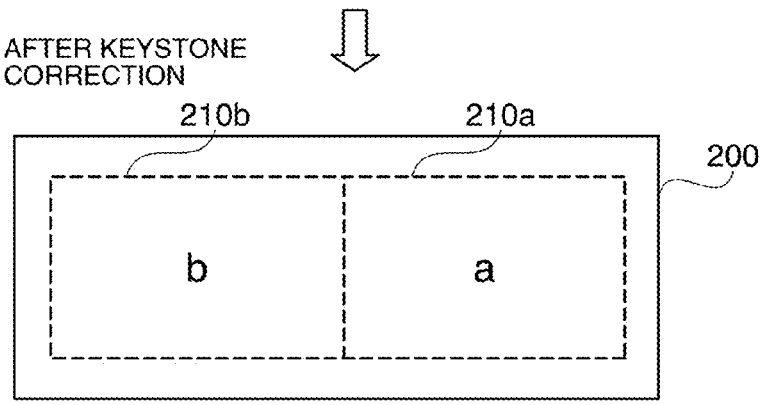
FIG. 8
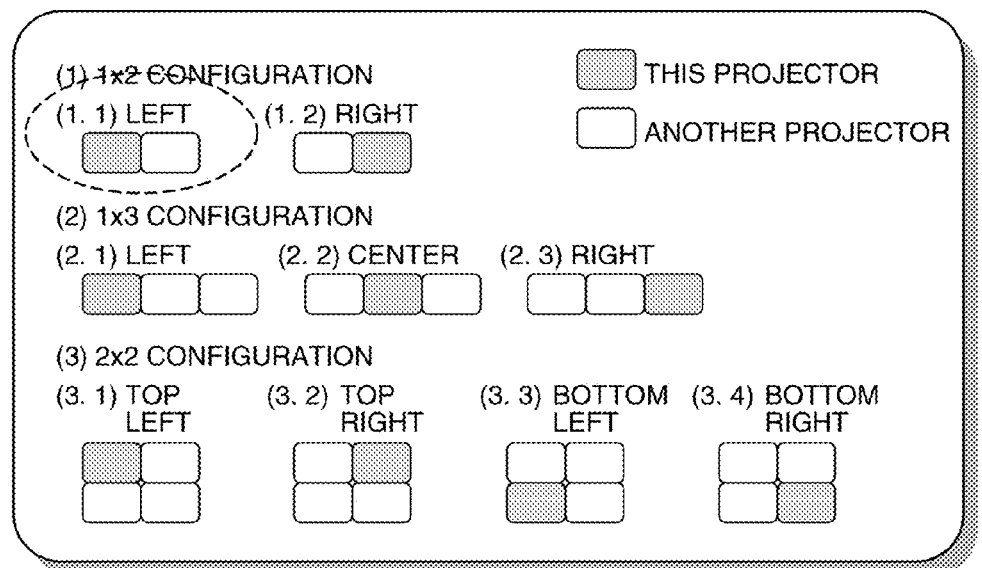

PROJECTOR, MULTI-SCREEN SYSTEM, PROJECTOR CONTROL METHOD, COMPUTER PROGRAM PRODUCT, AND INFORMATION STORAGE MEDIUM

CROSS REFERENCE TO RELATED APPLICATIONS

The application is a continuation of U.S. patent application Ser. No. 12/370,451 filed Feb. 12, 2009, which claims priority from Japanese Patent Application Nos. 2008-031301 filed Feb. 13, 2008 and 2008-279300 filed Oct. 30, 2008, each of which is hereby incorporated by reference in its entirety.

BACKGROUND

Traditionally, with respect to a projection-type display system, it is proposed in Japanese Patent Publication No. JP-A-8-168039 that "an inspection pattern is combined with video signals 810 and 820 and projected onto a screen 7 from two projectors 110 and 120. The position of this inspection pattern is detected by an image sensor 60, and on the basis of the detected position, a displacement quantity analyzing unit 50 calculates a positional shift of the projection position by image processing and so on, as a displacement quantity. In accordance with this displacement quantity of the projection position, feedback is given to display position adjustment mechanism units 210 and 220 and the positional shift is automatically corrected optically and mechanically. Thus, pixel alignment of plural projectors to realize high definition can be carried out easily and accurately," as a technique for the purpose of "providing a projection-type display system that facilitates pixel alignment in order to achieve light weight and high definition, and a projection position adjusting method for the same."

With respect to a multi-screen display apparatus, it is proposed in Japanese Patent Publication No. JP-A-2000-241879 that "an automatic screen position adjustment device for a multi-screen display apparatus including a reflection mirror and a light detection sensor arranged for common use at a seam part of screens that are next to each other, wherein light projected from projectors that are next to each other is reflected by the reflection mirror and a detection signal obtained by detecting the reflected light by the light sensor is used to automatically adjust the screen position of video light projected from the projectors, to a predetermined position," as a technique to cope with a problem that "traditionally, in a multi-screen display apparatus, a person skilled in the art takes a long time to make screen position adjustment in order to match seams of videos displayed on screens that are next to each other."

With respect to a table-type display, it is proposed in Japanese Patent Publication No. JP-A-2006-251604 that "an image sensor 51 is caused to operate first, and an image pickup signal from the image sensor 51 is taken into an image pickup data processing unit 63. The image pickup data processing unit 63 detects the coordinate position of a mark MA on a screen 40 and updates a position conversion table in a position data conversion table unit 64. Thus, initial processing is complete. In this state, when an image signal is inputted to an image data processing unit 61 from outside, the image data processing unit 61 carries out coordinate conversion for the image signal by referring to the position conversion table in the position data conversion table unit 64 via a control unit 65. Thus, image light modulated by light valves 35a, 35b and 35c is projected to perfectly fit in a display area 41 of the screen 40," as a technique for the purpose of "providing a table-type display that enables accurate projection of an image at a target position on a screen."

Traditionally, if a multi-screen system is formed by using plural projectors, the person who installs the system manually confirms and adjusts the positional relation between each projector and screen, lens power, defocusing and so on. This requires a considerable amount of time and effort.

With respect to this point, it is described in JP-A-8-168039 that pixel alignment of plural projectors is carried out by using the image sensor 60. However, this achieves higher definition of a single screen and no specific measures are described for positional alignment of projectors in a multi-screen system.

In JP-A-2000-241879, the reflection mirror and the light detection sensor must be arranged at the seam part of screens. Additional cost and work are required for this.

In JP-A-2006-251604, since coordinate conversion of an image signal is carried out to match the mark MA on the screen 40, the mark MA must be provided in advance on the screen 40. This poses a problem in terms of versatility.

SUMMARY

An embodiment of the disclosure may provide a projector which enables easy configuration of a multi-screen system.

According to at least one embodiment of the disclosure, a projector includes: a video signal processing unit that generates an output video signal based on an input video signal; a keystone correction unit that carries out keystone correction of a video signal; a projection unit that projects a video based on the output video signal; an image pickup unit that picks up an image of an image pickup object; and a control unit that controls operation of the keystone correction unit and the image pickup unit. The image pickup unit picks up an image of the video projected by the projection unit and outputs the picked-up image to the control unit. The control unit determines whether the picked-up image includes a projection video other than the video projected by the projection unit or not. If the control unit determines that the picked-up image includes a projection video other than the video projected by the projection unit, the control unit instructs the keystone correction unit to carry out keystone correction of the video signal in accordance with the picked-up image. The keystone correction unit carries out keystone correction of the input video signal or the output video signal so that an edge of the video projected by the projection unit contacts an edge of the projection video other than the video projected by the projection unit.

Thus, simply by the functions provided in the projector, the edges of the other projection video and of the projection video of the projector may be aligned. Therefore, a measuring unit or the like need not be provided separately to form multi-screens and a multi-screen system may be automatically configured easily.

The projector has a lens shift unit that shifts a lens provided in the projection unit and thereby changes projection position of the video projected by the projection unit. If the control unit determines that the picked-up image picked up by the image pickup unit includes a projection video other than the video projected by the projection unit, the control unit instructs the lens shift unit to change the projection position in accordance with the picked-up image. The lens shift unit changes the projection position of the video projected by the projection unit so that an edge of the video projected by the projection unit contacts an edge of the projection video other than the video projected by the projection unit.

Thus, even if the position of installation of the projector is considerably deviated and therefore proper multi-screens cannot be automatically configured by keystone correction alone, the position of the projection video may be corrected and proper multi-screens may be automatically configured.

The projector has a zoom control unit that controls focal length of a zoom lens provided in the projection unit and configured to have variable focal length. If the control unit determines that the picked-up image picked up by the image pickup unit includes a projection video other than the video projected by the projection unit, the control unit instructs the zoom control unit to change the focal length of the zoom lens in accordance with the picked-up image. The zoom control unit changes the focal length of the zoom lens so that an edge of the video projected by the projection unit contacts an edge of the projection video other than the video projected by the projection unit.

Thus, even if the position of installation of the projector is considerably deviated and therefore proper multi-screens cannot be automatically configured by keystone correction or lens shift alone, the size of the projection video may be optically corrected and proper multi-screens may be automatically configured.

In the projector, the projection unit projects a video pattern unique to the projector, and the image pickup unit picks up, together with the video pattern, an image of the video projected by the projection unit and outputs the picked-up image and the video pattern to the control unit. The control unit determines whether the picked-up image includes a projection video other than the video projected by the projection unit or not. If the control unit determines that the picked-up image includes a projection video other than the video projected by the projection unit, the control unit gives the instruction so that positional relation between the video projected by the projection unit and the projection video other than the video projected by the projection unit coincides with predetermined positional relation with reference to the video pattern.

Thus, when plural projection videos are shown on the screen, which of these videos is the projection video of the projector may be easily identified and the reference for correction in configuring multi-screens may be clarified. Therefore, multi-screens may be automatically configured more accurately.

The projector has an operation signal input unit that receives an input of an operation signal corresponding to operation detail. The operation signal input unit receives an input of an operation signal designating positional relation between the video projected by the projection unit and the projection video other than the video projected by the projection unit, and outputs the operation signal to the control unit. The control unit gives the instruction so that the video projected by the projection unit coincides with the positional relation designated by the operation signal.

Thus, when plural projection videos are shown on the screen, correct positional relation between the projection video of the projector and the other projection video may be clarified and multi-screens may be automatically configured more accurately.

According to another embodiment of the disclosure, a multi-screen system includes plural units of the above projector.

Thus, manual adjustment or the like in configuring a multi-screen system is no longer necessary and the time and cost for constructing a multi-screen system may be reduced.

According to still another embodiment of the disclosure, a projector control method is a method for controlling a projector including a video signal processing unit that generates an output video signal based on an input video signal, a keystone correction unit that carries out keystone correction of a video signal, a projection unit that projects a video based on the output video signal, and an image pickup unit that picks up an image of an image pickup object. The methods includes: causing the image pickup unit to pick up an image of a video projected by the projection unit and to output the picked-up image; determining whether the picked-up image includes a projection video other than the video projected by the projection unit or not; and if it is determined that the picked-up image includes a projection video other than the video projected by the projection unit, causing the keystone correction unit to carry out keystone correction of the input video signal or the output video signal in accordance with the picked-up image so that an edge of the video projected by the projection unit contacts an edge of the projection video other than the video projected by the projection unit.

Thus, simply by the functions provided in the projector, the edges of the other projection video and of the projection video of the projector may be aligned. Therefore, a measuring unit or the like need not be provided separately to form multi-screens and a multi-screen system may be automatically configured easily.

According to still another embodiment of the disclosure, a projector control program causes a control unit provided in a projector to execute the above projector control method.

Thus, the above functions may be realized by software.

According to still another embodiment of the disclosure, an information storage medium stores the above projector control program.

Thus, the software realizing the above functions may be carried in a separate medium.

BRIEF DESCRIPTION OF THE DRAWINGS

The invention will be described with reference to the accompanying drawings, wherein like numbers reference like elements.

FIG. 3A and FIG. 3B illustrate procedures for configuring a proper multi-screen system by keystone correction.

FIG. 5A to FIG. 5C illustrate procedures for configuring a proper multi-screen system by keystone correction.

FIG. 7A and FIG. 7B show procedures for configuring a proper multi-screen system according to a fourth embodiment.

FIG. 8 shows an exemplary screen for a user to select a screen configuration.

DESCRIPTION OF EXEMPLARY EMBODIMENTS

First Embodiment

Figure 1:
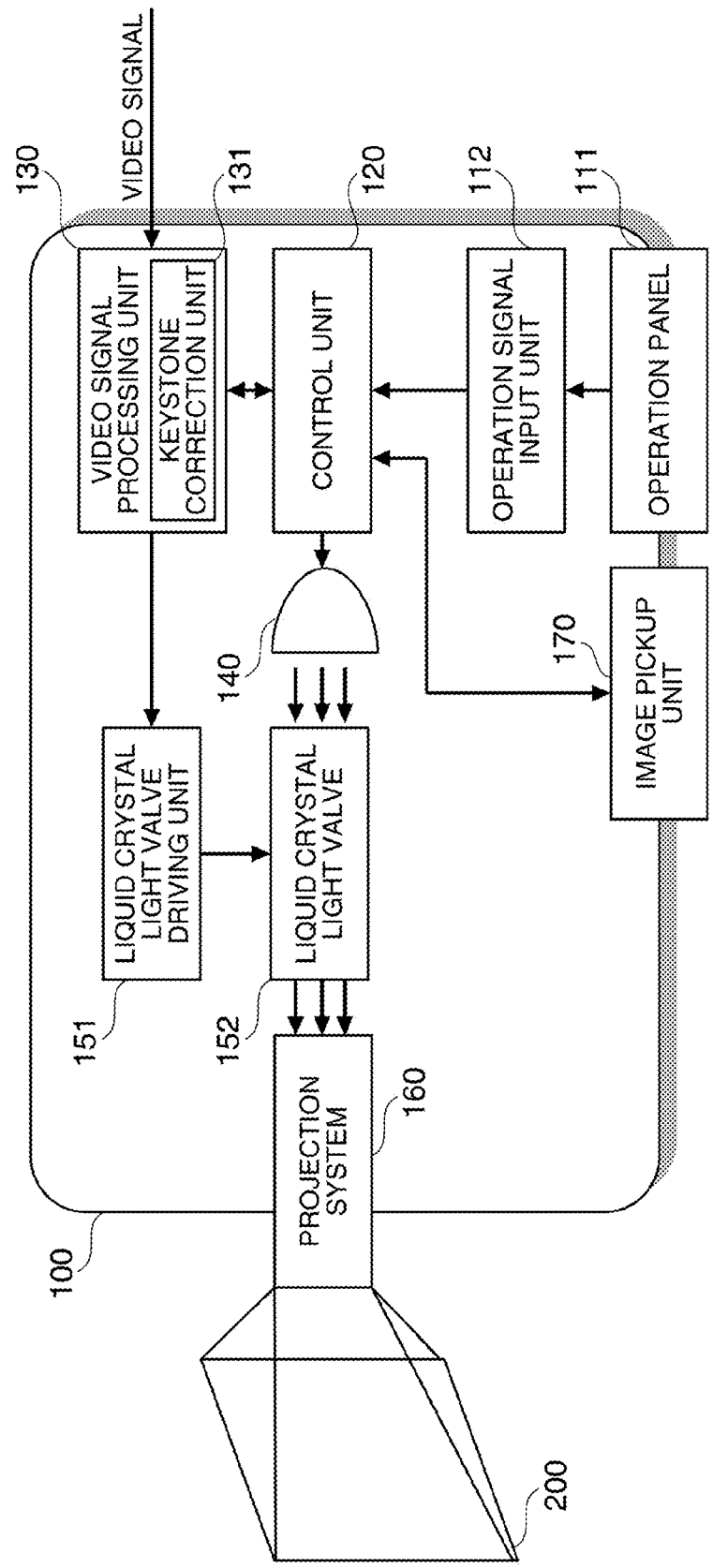
FIG. 1 is a functional block diagram showing a projector 100 according to a first embodiment.

FIG. 1 is a functional block diagram showing a projector 100 according to a first embodiment of the invention.

The projector 100 has an operation panel 111, an operation signal input unit 112, a control unit 120, a video signal processing unit 130, a keystone correction unit 131, a light source 140, a liquid crystal light valve driving unit 151, a liquid crystal light valve 152, a projection system 160, and an image pickup unit 170.

The operation panel 111 has buttons and so on for a user to input operation instructions to the projector 100. The operation panel 111 generates an operation signal corresponding to operation detail and outputs the operation signal to the operation signal input unit 112.

The operation signal input unit 112 receives the operation signal outputted from the operation panel 111 and converts the operation signal to a suitable format for processing by the control unit 120, for example, by converting the operation signal to a digital signal. The operation signal input unit 112 then outputs the operation signal to the control unit 120.

The control unit 120 receives the operation signal from the operation signal input unit 112 and carries out control corresponding to this signal. The control unit 120 also controls operations of the video signal processing unit 130, the keystone correction unit 131, the light source 140 and the image pickup unit 170.

The control unit 120 can be configured by hardware such as a circuit device that realizes its functions or can be configured by an operation device such as a CPU (central processing unit) or a microcomputer, and software that prescribes its operation.

The video signal processing unit 130 has an interface that receives an input video signal provided from an external device or the like that is outside the projector 100. The video signal processing unit 130 generates an output video signal in accordance with the input video signal and an instruction from the control unit 120, and outputs the output video signal to the liquid crystal light valve driving unit 151.

The keystone correction unit 131 corrects the input video signal or the output video signal in order to correct a keystone distortion generated in the case where a video is projected from the projector 100 that is installed with an inclination. The keystone correction unit 131 can be configured as an independent functional unit or can be configured as a function of the video signal processing unit 130 as shown in FIG. 1. The keystone correction unit 130 may also be configured as part of the control unit 120.

The video signal processing unit 130 is formed by a microprocessor or the like and executes a built-in program to carry out the above processing. The keystone correction unit 131 has a required configuration according to its form.

The light source 140 is a light source supply unit for a video to be ultimately displayed to the user. The light source 140 emits light toward the liquid crystal light valve 152.

The liquid crystal light valve driving unit 151 drives the liquid crystal light valve 152 in accordance with the output video signal outputted by the video signal processing unit 130.

In the liquid crystal light valve 152, plural pixels, not shown, are formed in a matrix-like form. As the transmittance of each pixel is adjusted by the liquid crystal light valve driving unit 151, the liquid crystal light valve 152 modulates the light emitted from the light source 140 and emits the modulated light toward the projection system 160.

The light emitted from the liquid crystal light valve 152 is magnified and projected on a screen 200 by the projection system 160.

The projection system 160 has a focusing mechanism capable of changing the focal point of projected light and a zoom mechanism capable of changing the magnifying power of projected light.

The "projection unit" in this invention is equivalent to the light source 140, the liquid crystal light valve driving unit 151, the liquid crystal light valve 152 and the projection system 160.

The image pickup unit 170 includes an image pickup device such as a CCD camera and outputs a picked-up image to the control unit 120. When necessary, the image pickup unit 170 may store picked-up image data to a storage device such as a memory, not shown, and the control unit 120 may be configured to scan this image data.

The image pickup unit 170 is arranged in such a direction that the image pickup object is situated in the projection direction of the projection system 160, and is intended to pick up a projection video, as will be described later.

The configuration of the projector 100 according to the first embodiment is described above.

Now, position alignment in configuring a multi-screen system using the projector 100 according to the first embodiment will be described.

Figure 2A:
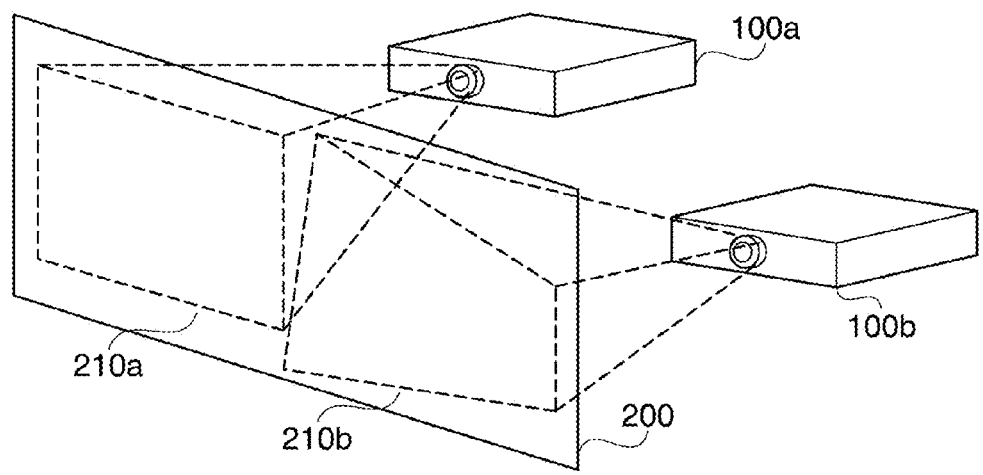
FIG. 2A and FIG. 2B show how a multi-screen system is configured.
Figure 2B:
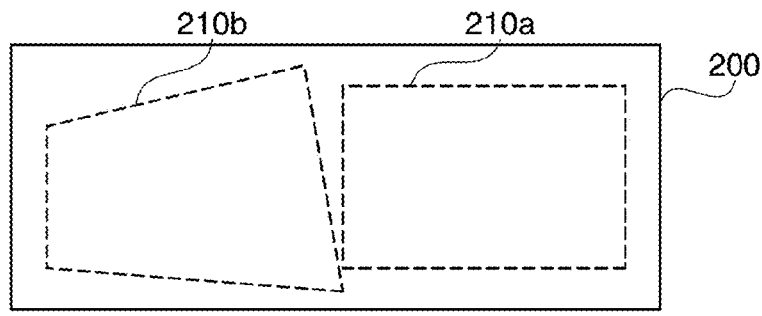

FIG. 2A and FIG. 2B show how a multi-screen system is configured by using projectors 100a and 100b according to the first embodiment.

FIG. 2A shows the arrangement of each projector.

Here, it is considered that the projectors 100a and 100b are put laterally side by side to form 1×2 multi-screens. A video projected on the screen 200 by the projector 100a is defined as a projection video 210a. A video projected on the screen 200 by the projector 100b is defined as a projection video 210b.

FIG. 2B is a front view of the screen 200 in the state shown in FIG. 2A.

The installation position of the projector 100b is slightly inclined with respect to the screen 200. This causes a keystone distortion in the projection video 210b.

Meanwhile, the installation position of the projector 100a is appropriate to the screen 200. Therefore, the projection video 210a is rectangular with no distortion.

In the installation state as shown in FIG. 2A and FIG. 2B, if keystone correction is carried out only for the projection video of the projector 100b, the edges of the projection videos 210a and 210b are aligned and proper multi-screens can be configured.

Thus, it is now considered that the projector 100b itself detects the state of the keystone distortion as shown in FIG. 2A and FIG. 2B and carries out keystone correction of the projection video by using the image picked up by the image pickup unit 170, thus automatically configuring proper multi-screens.

FIG. 3A and FIG. 3B illustrate procedures for configuring proper multi-screens by keystone correction. Hereinafter, the procedures shown in FIG. 3A and FIG. 3B will be described as well as the operation procedures of the projector 100b.

FIG. 3A shows the state of projection videos on the screen 200 before the projector 100b carries out keystone correction. In this state, multi-screens are automatically configured through operation procedures such as the following steps 1 to 6.

In Step 1, the user views the state of the screen 200 and recognizes that multi-screens are not properly configured. The user presses a button "automatic multi-screen configuration" or the like provided on the operation panel 111 of the projector 100*b* and thus gives the projector 100*b* an instruction that multi-screens should be properly configured automatically.

In Step 2, an operation signal corresponding to the operation input carried out by the user in Step 1 is outputted to the control unit 120 via the operation signal input unit 112. As the control unit 120 receives the operation signal, the control unit 120 instructs the image pickup unit 170 to pick up an image of the screen 200.

In Step 3, the image pickup unit 170 picks up an image of the screen 200 on which the projection videos 210*a* and 210*b* are projected, and outputs the picked-up image to the control unit 120.

In Step 4, the control unit 120 acquires and analyzes the picked-up image and thereby learns that the picked-up image includes the projection video 210*a* and that the edge of the projection video 210*b* is not aligned with the edge of the projection video 210*a*. Further, the control unit 120 learns that the projection video 210*b* has a keystone distortion.

Whether the picked-up image includes a projection video other than the projection video 210*b* or not can be determined, for example, by identifying the shape of the projection video. If plural projection videos are included, plural quadrilateral projection videos exist. If projection videos overlap each other, the number of vertices of the projection videos exceeds four. Therefore, these features may be identified.

In Step 5, the control unit 120 instructs the keystone correction unit 131 to carry out keystone correction of the projection video. The control unit 120 may designate the correction quantity based on the picked-up image. Alternatively, the keystone correction unit 131 may acquire the picked-up image and find the correction quantity.

At this time, if the picked-up image is temporarily stored in a storage device such as a memory, not shown, it is convenient for communications of the picked-up image data.

In Step 6, the keystone correction unit 131 executes keystone correction of the input video signal or the output video signal in accordance with the instruction from the control unit 120 and causes the edge of the projection video 210*b* to be aligned with the edge of the projection video 210*a*.

FIG. 3B shows the state of projection videos on the screen 200 after the projector 100*b* carries out keystone correction. The keystone distortion of the projection video 210*b* is eliminated by the keystone correction and the projection video 210*b* is corrected so that the projection videos 210*a* and 210*b* contact each other at their edges.

In this case, it is assumed that there is only a slight deviation in the installation position of the projector 100*b*. Therefore, the edges of the projection videos 210*a* and 210*b* are aligned with each other by keystone correction alone and proper multi-screens are configured.

If necessary, not only the keystone distortion but also the size of the projection video 210*b* may be corrected. This correction can be executed as part of the processing to adjust the length of the four sides of the projection video 210*b* through keystone correction.

Since the magnification to which the size should be changed can be found by analyzing the picked-up image and then comparing the size of the projection video 210*a* with the size of the projection video 210*b*, the control unit 120 or the keystone correction unit 131 can use this to calculate the extent to which the size of the projection video 210*b* should be corrected.

As described above, in the projector 100 according to the first embodiment, the control unit 120 recognizes that a projection video which forms multi-screens has a keystone distortion, from the image of the screen 200 picked up by the image pickup unit 170, and instructs the keystone correction unit 131 to carry out keystone correction of the projection video.

Thus, under predetermined conditions such as that there is only a light deviation in the installation position of the projectors which configure multi-screens, proper multi-screens having projection videos aligned each other at their edges can be automatically configured simply by keystone correction.

In carrying out keystone correction of the projection video, the size of the projection video may be adjusted. Thus, even if the installation positions of the projectors is deviated in back and forth directions, proper multi-screens having projections aligned with each other at their edges can be automatically configured.

Second Embodiment

In a second embodiment of the invention, a configuration and operation corresponding to a case where proper multi-screens having projection videos aligned with each other at their edges cannot be configured by keystone correction by the keystone correction unit 131 alone.

Figure 4:
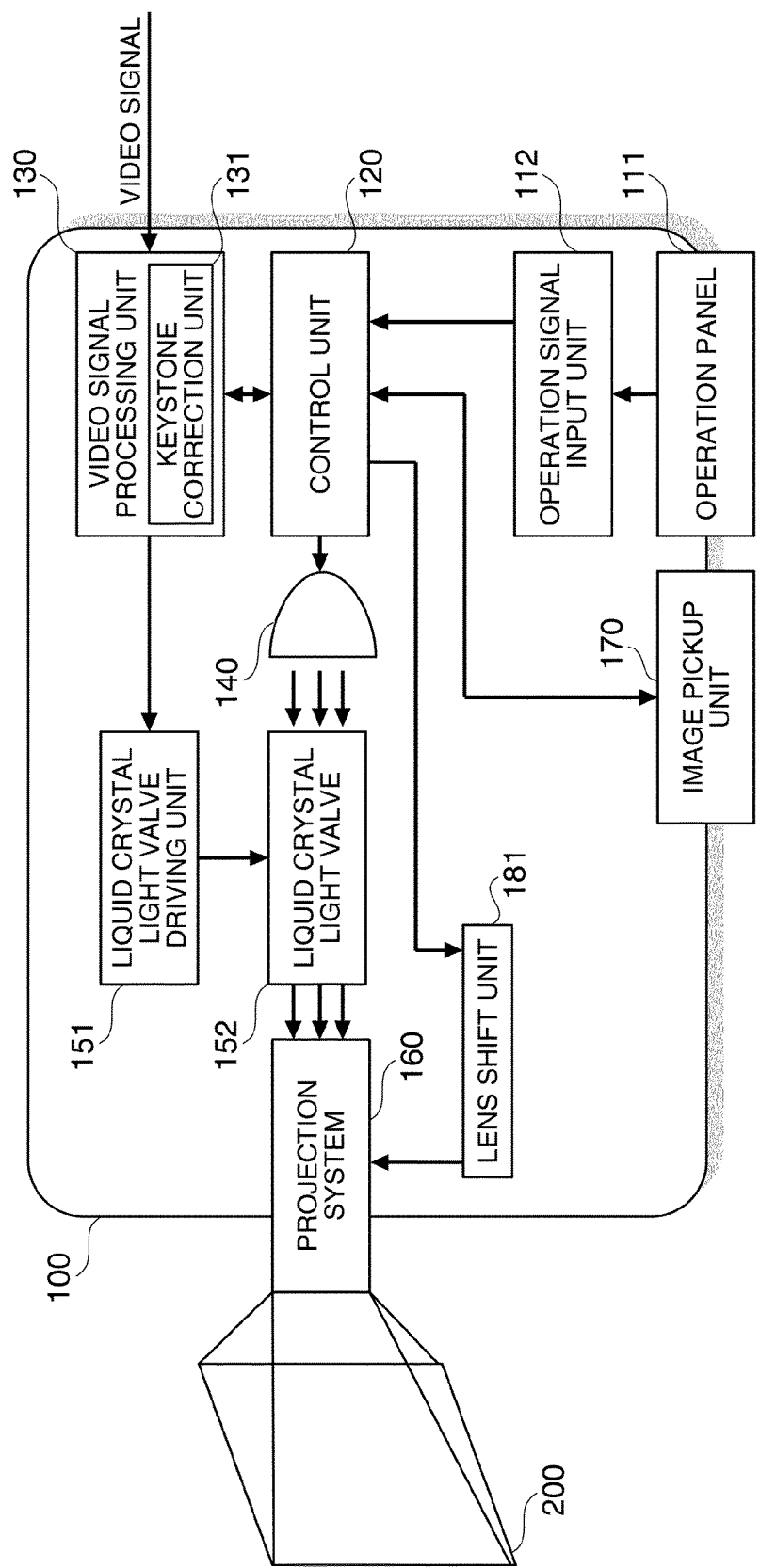
FIG. 4 is a functional block diagram showing a projector 100 according to a second embodiment.

FIG. 4 is a functional block diagram showing a projector 100 according to the second embodiment.

The projector 100 according to the second embodiment additionally has a lens shift unit 181 in addition to the configuration of the first embodiment described with reference to FIG. 1. The other parts of the configuration are the same as in FIG. 1 and therefore will not be descried further in detail.

The lens shift unit 181 has a driving unit such as a motor to shift an optical lens provided in the projection system 160. The lens shift unit 181 shifts the optical lens in accordance with an instruction from the control unit 120 and thereby changes the projection position of a projection video.

The direction and quantity in which the projection position can be changed depend on the direction and quantity in which the optical lens can be shifted. For example, the optical lens can be moved back, forth, left and right, and the projection video can be accordingly shifted back, forth, left and right within a predetermined range.

The configuration of the projector 100 according to the second embodiment is described above.

Now, position alignment in configuring a multi-screen system by using the projector 100 according to the second embodiment will be described.

FIG. 5A to FIG. 5C illustrate procedures for configuring proper multi-screens by keystone correction. Hereinafter, the procedures of FIG. 5A to FIG. 5C will be described as well as operation procedures of the projector 100*b*.

FIG. 5A shows the state of projection videos on the screen 200 before the projector 100*b* carries out keystone correction. In this state, multi-screens are automatically configured through operation procedures such as the following steps 1 to 6.

In Step 1, the same operations as described with reference to FIG. 3A and FIG. 3B in the first embodiment are executed until the keystone correction unit 131 executes keystone correction of a projection video.

Here, unlike FIG. 3A and FIG. 3B in the first embodiment, the installation position of the projector 100*b* is considerably deviated, and therefore the edges of the projection videos 210*a* and 210*b* cannot be aligned with each other by keystone correction alone. Thus, it is assumed that the projection videos are in the state as shown in FIG. 5B.

In Step 2, after the keystone correction unit 131 executes keystone correction, the control unit 120 instructs the image pickup unit 170 to pick up an image of the screen 200 again.

This step is significant as a confirmation of whether the edges of the projection videos are aligned with each other or not, as a result of keystone correction. Similarly, the result may be confirmed in the first embodiment as well.

In Step 3, the image pickup unit 170 picks up an image of the screen 200 on which the projection videos 210*a* and 210*b* are projected, and outputs the picked-up image to the control unit 120.

In Step 4, the control unit 120 acquires and analyzes the picked-up image and thereby learns that the edge of the projection video 210*b* is not aligned with the edge of the projection video 210*a*.

In Step 5, the control unit 120 instructs the lens shift unit 181 to shift the projection video. The control unit 120 may designate the shift quantity based on the picked-up image. Alternatively, the lens shift unit 181 may acquire the picked-up image and find the shift quantity.

In Step 6, the lens shift unit 181 shifts the optical lens in accordance with the instruction from the control unit 120 and shifts the projection video 210*b* so that the edge of the projection video 210*b* is aligned with the edge of the projection video 210*a*. Thus, the projection videos on the screen 200 are in the state as shown in FIG. 5C and proper multi-screens are configured.

As described above, in the projector 100 according to the second embodiment, the operations by both the keystone correction unit 131 and the lens shift unit 181 expand the range in which the edges of the projection videos can be automatically aligned with each other. Therefore, proper multi-screens can be automatically configured by using projectors installed in a broader range.

Third Embodiment

In a third embodiment of the invention, a projector will be described which optically corrects the size of a projection video, thereby automatically aligns the edges of projection videos with each other, and thus automatically configures proper multi-screens.

Figure 6:
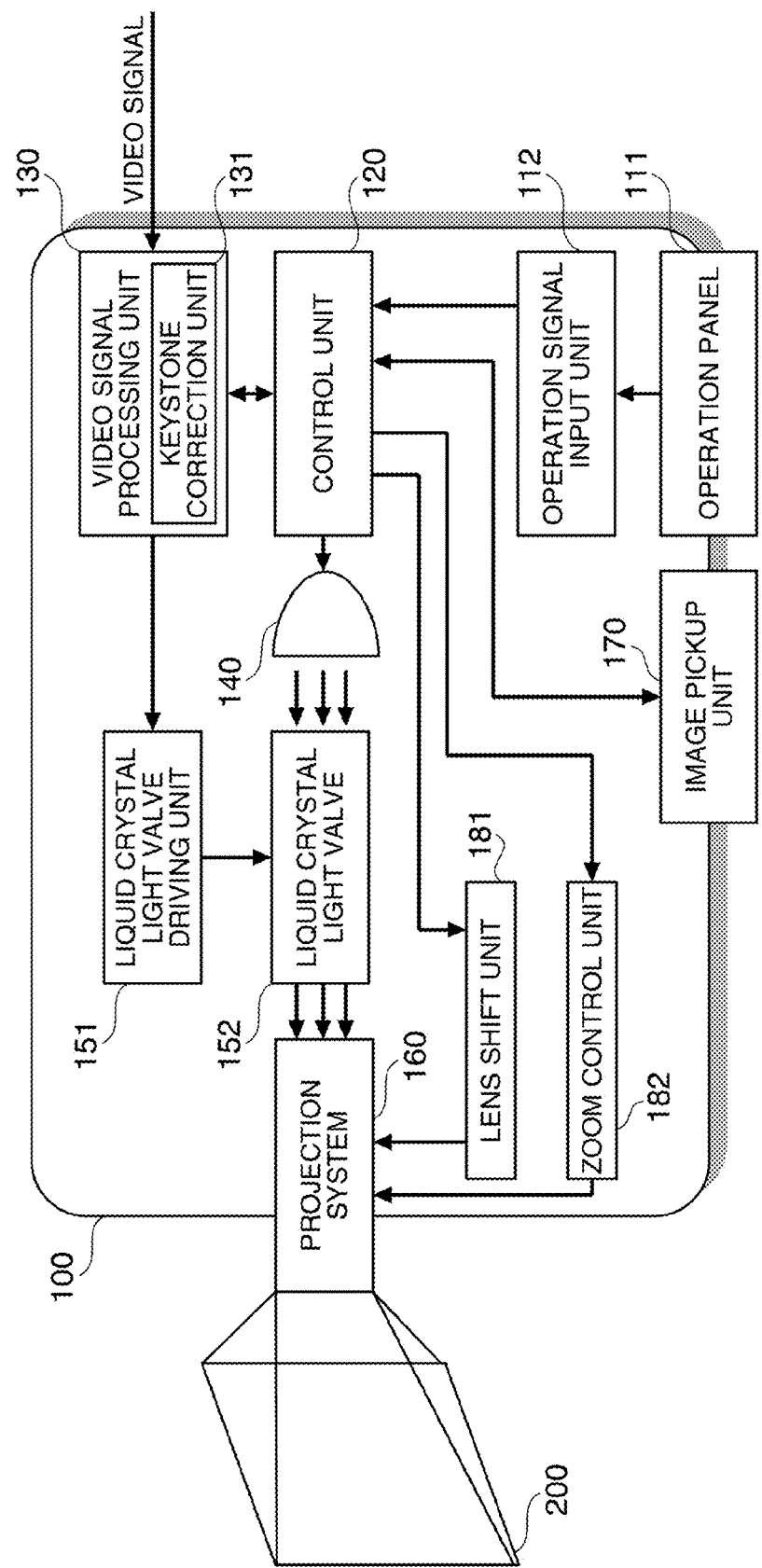
FIG. 6 is a functional block diagram showing a projector 100 according to a third embodiment.

FIG. 6 is a functional block diagram showing a projector 100 according to the third embodiment.

The projector 100 according to the third embodiment additionally has a zoom control unit 182 in addition to the configuration of the second embodiment described with reference to FIG. 4. The other parts of the configuration are the same as in FIG. 4 and therefore will not be described further in detail.

The zoom control unit 182 has the function of controlling the focal length of the zoom lens provided in the projection system 160. The zoom control unit 182 changes the focal length of the zoom lens in accordance with an instruction from the control unit 120 and thus changes the size of a projection video. The zoom control unit 182 also adjusts focus of the lens in accordance with the need.

The quantity in which the size of a projection video can be changed depends on the specifications of the zoom lens.

The configuration of the projector 100 according to the third embodiment is described above.

Now, position alignment in configuring a multi-screen system by using the projector 100 according to the third embodiment will be described.

On principle, the operation in which the projector 100 according to the third embodiment configures multi-screens is similar to the operation described in the first and second embodiments.

However, if the position where the projector 100 is installed is too far from or too close to the screen 200, size correction of a projection video executed by the keystone correction unit 131 or the like is not enough and the edges of projection videos may be not aligned with each other in some cases.

In such cases, optical size correction by the zoom control unit 182 can be also be used to expand the range in which size correction can be made.

The control unit 120 can calculate the quantity of size correction based on the picked-up image.

Referring to FIG. 6, the configuration having the zoom control unit 182 in addition to the configuration described with reference to FIG. 4 in the second embodiment is described. However, the configuration described with reference to FIG. 1 in the first embodiment may additionally have the zoom control unit 182 as well.

Fourth Embodiment

In a fourth embodiment of the invention, an operation to explicitly discriminate a projection video from the projector and another projection video when correcting the projection video will be described.

The configuration of a projector 100 according to the fourth embodiment is similar to the configuration described in the first to third embodiments and therefore will not be described further in detail. The operations other than the operation described in the fourth embodiment are similar to those described in the first to third embodiments and therefore will not be described further in detail.

With reference to FIG. 3 described in the first embodiment, the projector 100*b* carries out keystone correction of the projection video 210*b*. However, the projector 100*b* cannot carry out proper keystone correction unless the projector 100*b* can recognize which of 210*a* and 210*b* is the video projected by the projector 100*b* itself.

For example, if the projector 100*b* erroneously recognizes its own projection video as 210*a*, it is determined that the video needs no keystone correction.

Thus, the projector 100 according to the fourth embodiment projects a video pattern that is unique to the projector 100 when automatically configuring multi-screens, and thus can explicitly recognize its own projection video.

Hereinafter, procedures for automatically configuring multi-screens according to the fourth embodiment will be described with reference to FIG. 7A and FIG. 7B.

FIG. 7A and FIG. 7B illustrate procedures for configuring proper multi-screens in the fourth embodiment. The procedures shown in FIG. 7A and FIG. 7B will now be described together with operation procedures of the projector 100*b*.

As the procedures described with reference to FIG. 3A, the user presses a button such as an "automatic multi-screen configuration" button provided on the operation panel 111 of the projector 100*b* and thus gives the projector 100*b* an instruction that multi-screens should be automatically and properly configured.

As the control unit 120 receives an operation signal for this, the control unit 120 instructs the image pickup unit 170 to pick up an image of the screen 200. The control unit 120 also instructs the video signal processing unit 130 to project a video pattern that is unique to the projector 100*b*.

The video signal processing unit 130 generates a video pattern that is unique to the projector 100b and projects the video pattern onto the screen 200 through the elements including the liquid crystal light valve driving unit 151 to the projection system 160.

Here, as shown in FIG. 7A, the unique pattern of the projector 100a is indicated by "a" and the unique pattern of the projector 100b is indicated by "b". However, these patterns may be arbitrary as long as each projector can be identified from the pattern. For example, each projection video can be painted over in a color that is proper to each projector.

The image pickup unit 170 picks up an image of the screen 200 on which the projection videos 210a and 210b are projected, and outputs the picked-up image to the control unit 120.

The control unit 120 acquires and analyzes the picked-up image and thereby learns that the projection video 210b has a keystone distortion. The control unit 120 also learns from the unique pattern of each projector that the projection video 210b is the projection video of the projector 100b.

The subsequent correction is similar to the correction described in the first embodiment and therefore will not be described further in detail.

Also in the correction described in the second and third embodiments, the projection video projected by the projector 100b can be explicitly identified similarly by using its unique pattern.

In the fourth embodiment, the projection of the unique pattern of each projector is described. However, this unique pattern may be inputted or selected by the user.

For example, the user is caused to input an identification number of the projector (which may be a simple one-digit number or the like) in advance. The identification number is projected as shown in FIG. 7A and FIG. 7B. With this identification number, the projection video of each projector is explicitly identified.

Each projector can learn its own identification number in advance from the user's input. Therefore, it can be easily determined that the projection video with the identification number included in the picked-up image is the projector's own projection video.

As described above, with the projector 100 according to the fourth embodiment, the projection video of each projector can be explicitly identified. Therefore, the projection video as a correction target is clarified and multi-screens can be accurately and automatically configured.

Fifth Embodiment

In the first to fourth embodiments, the procedures for automatically configuring 1×2 multi-screens are described. However, other multi-screen configurations can also be automatically formed by similar procedures.

However, as the number of screens increases, it becomes more difficult to determine which position should be used as a reference for correction of projection video.

Thus, in a fifth embodiment of the invention, the user is caused to input configurations such as the number of vertical and horizontal screens in advance, thus making it easier for the projector 100 to determine which position the projection video should be corrected to.

The configuration of a projector 100 according to the fifth embodiment is similar to the configuration described in the first to fourth embodiments and therefore will not be described further in detail. The operations other than the control operation described in the fifth embodiment are similar to those described in the first to fourth embodiment and therefore will not be described further in detail.

FIG. 8 shows an exemplary screen for the user to select a screen configuration in the fifth embodiment.

As the user selects a predetermined menu on the operation panel 111, an operation signal to this effect is outputted to the control unit 120. The control unit 120 instructs the video signal processing unit 130 to display a selection screen as shown in FIG. 8.

The video signal processing unit 130 projects a video as shown in FIG. 8 through the elements including the liquid crystal light valve driving unit 151 to the projection system 160.

The user can select the number of projectors to configure multi-screens and a screen configuration for them, in the screen shown in FIG. 8. FIG. 8 shows three screen configurations, that is, 1×2 configuration, 1×3 configuration, and 2×2 configuration. However, other screen configurations may also be selected.

In the screen shown in FIG. 8, where the projector should be situated in the multi-screens can be selected as well. For example, if the projector is the projector 100b shown in FIG. 2A, (1.1) in FIG. 8 can be selected.

By this selection, the projector can grasp the positional relation between its own projection video and the other projection video(s) in advance. Therefore, the reference for correcting the projection video is clarified and proper multi-screens can be securely and automatically configured.

For example, in FIG. 3 described in the first embodiment, even when it is difficult to determine which of 210a and 210b is the projection video of the projector 100b, it can be easily identified that the projection video 210b on the left is the projection video of the projector 100b if the projector 100b selects (1.1) in advance in the screen shown in FIG. 8.

Moreover, if the technique of projecting a unique pattern of the projector as described in the fourth embodiment is used together with the selection in the screen of FIG. 8, the projection video of the projector can be identified more securely.

In this case, the projector is installed in an extremely inclined direction. Therefore, even if the projection videos 210a and 210b are replaced with each other, each projector can explicitly grasp the relation between its own projection video and its projection position. Thus, the replacement of the projection videos can be automatically corrected and proper multi-screens can be automatically configured with a screen configuration in the correct order.

Figure 9A:
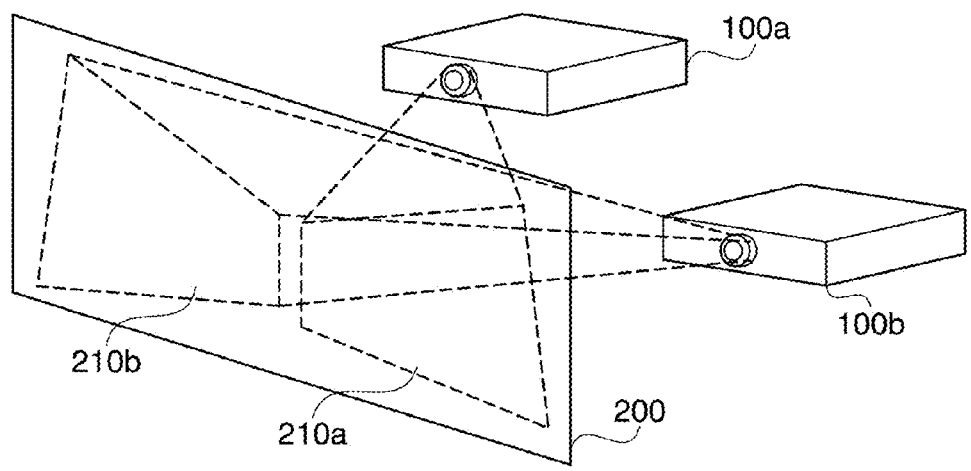
FIG. 9A and FIG. 9B show an example where the directions of installation of projectors are extremely inclined.
Figure 9B:
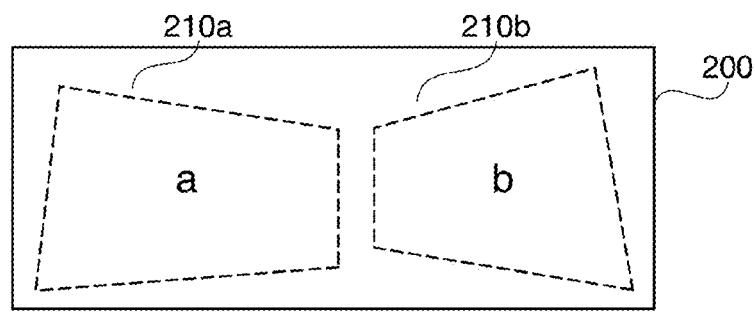

FIG. 9A and FIG. 9B show an example in which the projectors are installed in an extremely inclined direction.

In FIG. 9A, the projectors 100a and 100b are oblique with their installation directions crossing each other. Therefore, the positions of the projection videos 210a and 210b are reversed to the left and right, and the shape of each projection video is distorted into a trapezoid.

In this case, if each projector is caused to grasp its own screen position in the screen of FIG. 8 and the unique pattern of each projector is projected, the projection videos can be easily corrected.

For example, it is assumed that the projector 100b selects (1.1) in the screen of FIG. 8 and that the pattern "b" is projected as its unique pattern.

In this case, in FIG. 9B, the projection video 210b is supposed to be situated on the left side in the screen. However, as the picked-up image of the unique pattern "b" in FIG. 9B is identified, it can be known that the projection video 210b is shifted to the right.

In this case, the position of the projection video 210b is shifted to the left of the projection video 210a by using the function of the lens shift unit 181 described in the second embodiment and the positional relation of the projection videos can be properly corrected.

The subsequent correction is similar to the correction described in the foregoing embodiments.

If the projection video 210b is shifted to the left and consequently moved out of the screen 200, this is recognized from the picked-up image taken by the image pickup unit 170, and an error message that automatic correction is unavailable or the like may be displayed on the screen.

In this case, every time correction such as keystone correction, lens shift or optical zoom is finished, an image of the screen 200 is picked up by the image pickup unit 170 and availability of correction can be determined on the basis of the picked-up image.

As described above, with the projector 100 according to the fifth embodiment, since the user is caused to select the multi-screen configuration and the position of the projector, in the screen of FIG. 8, the projection videos can be corrected easily and securely.

Sixth Embodiment

In a sixth embodiment of the invention, an operation flow for realizing the operation of the projector 100 described in the first embodiment by software will be described. This software can be configured as a projector control program that prescribes the operation of the control unit 120.

Hereinafter, the operation flow of the projector control program according to the sixth embodiment will be described.

Figure 10:
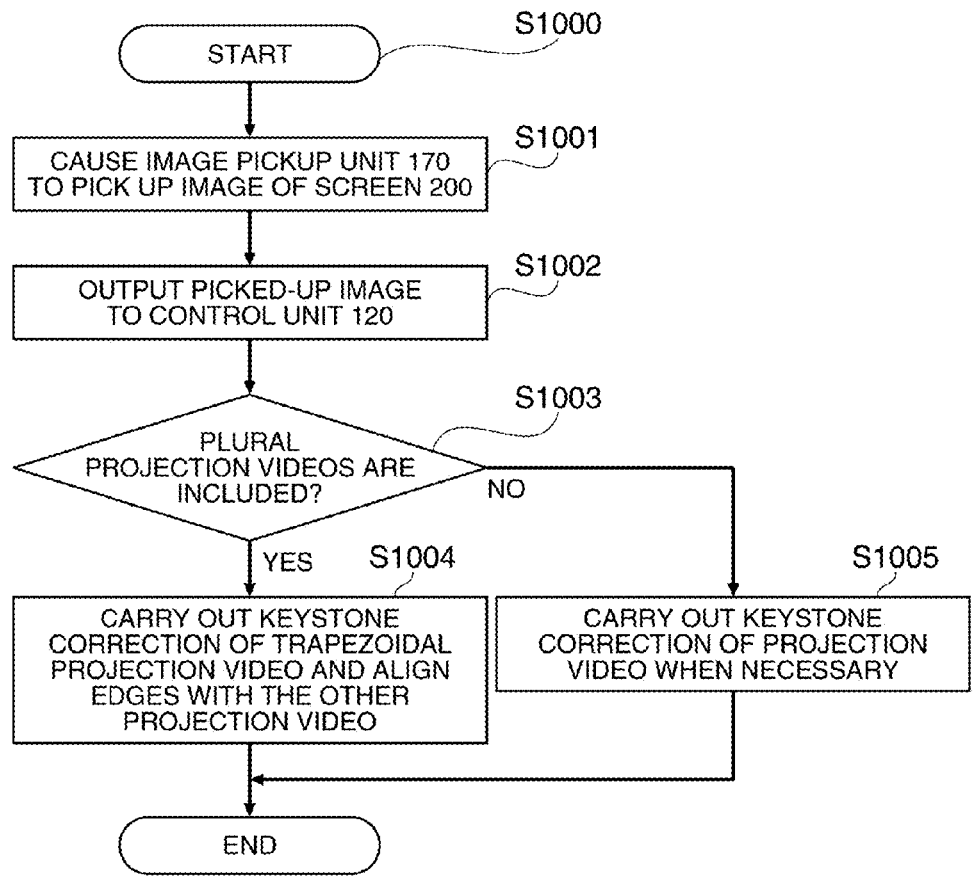
FIG. 10 shows an operation flow of a projector control program according to a sixth embodiment.

FIG. 10 shows the operation flow of the projector control program according to the sixth embodiment. Each step in FIG. 10 will now be described. Here, the state described in the first embodiment with reference to FIG. 2A and FIG. 2B is taken as an example.

In step S1000, the user presses a button such as an "automatic multi-screen configuration" button provided on the operation panel 111 of the projector 100b and gives the projector 100b an instruction that multi-screens should be automatically and properly configured.

An operation signal corresponding to this operation input is outputted to the control unit 120 via the operation signal input unit 112 and multi-screen configuration processing (the present operation flow) is started.

This step is equivalent to Step 1 described in the first embodiment.

In step S1001, the control unit 120 instructs the image pickup unit 170 to pick up an image of the screen 200.

In step S1002, the image pickup unit 170 picks up an image of the screen 200 and outputs the picked-up image to the control unit 120.

In step S1003, the control unit 120 acquires and analyzes the picked-up image and determines whether the picked-up image includes plural projection videos or not. Specifically, the shape of the projection videos or the like can be used for the determination, as described in Step 4 in the first embodiment.

If the picked-up image includes plural projection videos, the processing goes to step S1004. Otherwise, the processing goes to step S1005.

In step S1004, the control unit 120 instructs the keystone correction unit 131 to carry out keystone correction of the projection video that is distorted in a trapezoid and thus to align the edges of the projection videos. In accordance with the instruction from the control unit 120, the keystone correction unit 131 executes keystone correction of the input video signal or the output video signal and thus aligns the edges of the projection videos.

In step S1005, if the projection video is distorted, the control unit 120 instructs the keystone correction unit 131 to carry out keystone correction. In accordance with the instruction from the control unit 120, the keystone correction unit 131 executes keystone correction of the input video signal or the output video signal.

If the projection video is not distorted or there is no projection video, this step can be omitted.

As described above, in the sixth embodiment, the example of realizing the operation described in the first embodiment by software as a projector control program prescribing the operation of the control unit 120 is described.

The program is stored in advance in a storage device such as a ROM (read only memory), not shown. When the projector 100 is started, the control unit 120 reads this program and executes the control operation. This also applies to the following embodiments.

Seventh Embodiment

In a seventh embodiment of the invention, an operation flow for realizing the operation of the projector 100 described in the second embodiment by software will be described. This software can be configured as a projector control program that prescribes the operation of the control unit 120.

Hereinafter, the operation flow of the projector control program according to the seventh embodiment will be described.

Figure 11:
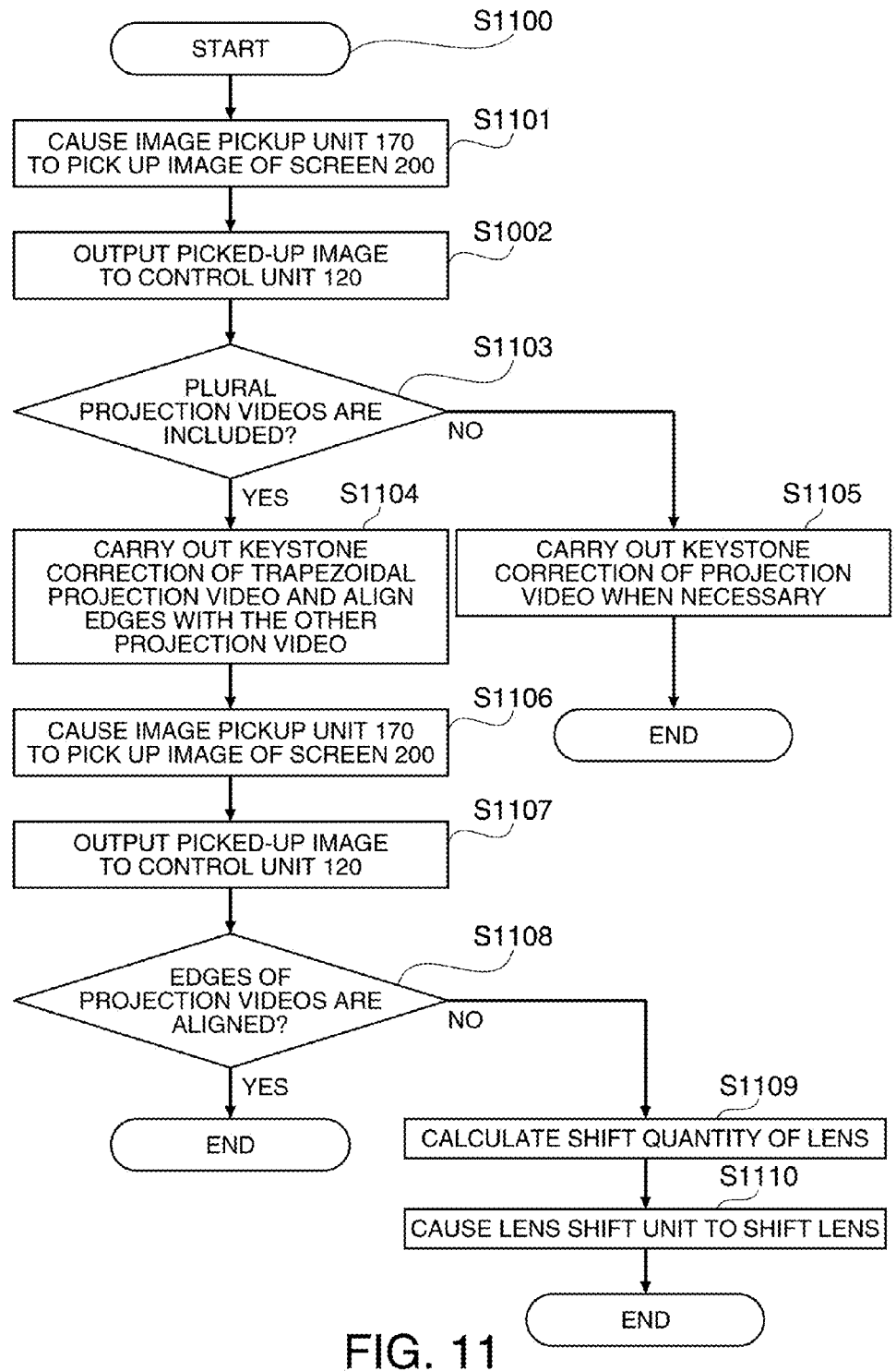
FIG. 11 shows an operation flow of a projector control program according to a seventh embodiment.

FIG. 11 shows the operation flow of the projector control program according to the seventh embodiment. Each step in FIG. 11 will now be described. Here, the state described in the second embodiment with reference to FIG. 5A to FIG. 5C will be taken as an example.

Steps S1100 to S1105 are similar to steps S1000 to S1005 shown in FIG. 10. However, it is now assumed that since the installation position of the projector 100b is considerably deviated, the edges of the projection videos 210a and 210b cannot be aligned with each other through keystone correction alone and the projection videos are in the state as shown in FIG. 5B.

In step S1106, after the keystone correction unit 131 executes keystone correction, the control unit 120 instructs the image pickup unit 170 to pick up an image of the screen 200 again.

In step S1107, the image pickup unit 170 picks up an image of the screen 200 and outputs the picked-up image to the control unit 120.

In step S1108, the control unit 120 acquires and analyzes the picked-up image and determines whether the edges of the projection videos are aligned with each other or not. If the edges are aligned, this operation flow ends. If the edges are not aligned, the processing goes to step S1109.

In step S1109, the control unit 120 decides the quantity of shift of the lens in order to shift the position of the projection video and align the edges of the projection videos. Specifically, the control unit 120 decides, by an arbitrary technique, the quantity of shift in causing the lens shift unit 181 to shift the lens in the next step S1110 and shifting the projection video.

The lens shift unit 181 may calculate the shift quantity in accordance with an instruction from the control unit 120.

In step S1110, the control unit 120 instructs the lens shift unit 181 to shift the projection video. The lens shift unit 181 shifts the optical lens in accordance with the instruction from the control unit 120 and thus aligns the edges of the projection videos.

As described above, in the seventh embodiment, the example of realizing the operation described in the second embodiment by software as a projector control program prescribing the operation of the control unit 120 is described.

Eighth Embodiment

As described in the third embodiment, in the case of combining zoom and lens shift to complement the correction range of keystone correction, the relative position of each projection video is changed by zoom control. Thus, it may be necessary to carry out lens shift again.

In eighth and ninth embodiments, exemplary operations in which zoom control and lens shift are combined will be described.

In the eighth embodiment of the invention, an operation flow for realizing the operation of the projector 100 described in the third embodiment by software will be described. This software can be configured as a projector control program that prescribes the operation of the control unit 120.

Hereinafter, the operation flow of the projector control program according to the eighth embodiment will be described.

Figure 12:
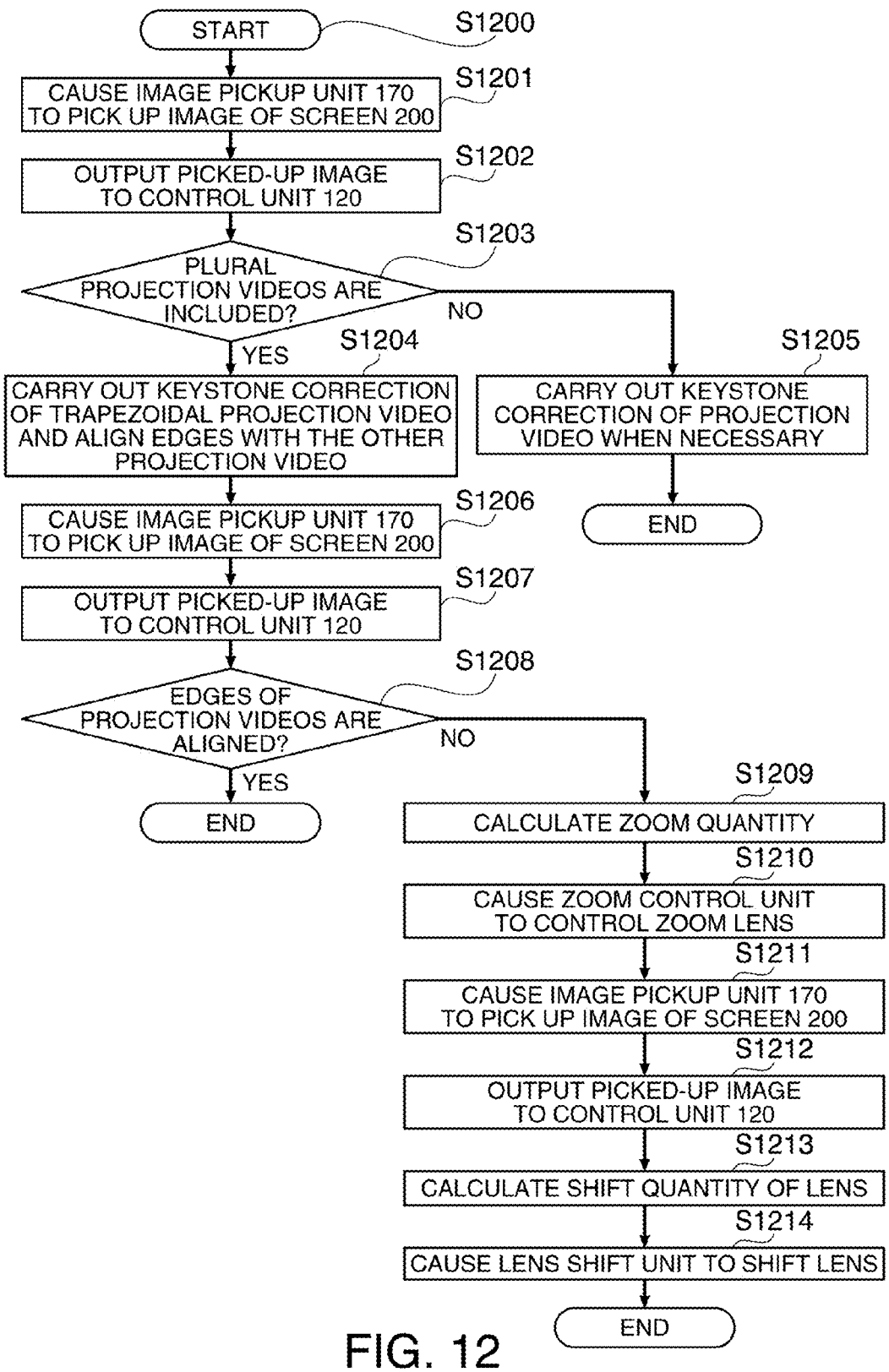
FIG. 12 shows an operation flow of a projector control program according to an eighth embodiment.

FIG. 12 shows the operation flow of the projector control program according to the eighth embodiment. Each step in FIG. 12 will now be described.

Steps S1200 to S1208 are similar to steps S1100 to S1108 in FIG. 11.

In step S1209, the control unit 120 decides the zoom quantity of the zoom lens in order to change the size of the projection videos and thus align the edges of the projection videos. Specifically, the zoom quantity is decided, for example, in such a manner that the length of one side of each projection video becomes equal.

The zoom control unit 182 may calculate the zoom quantity in accordance with an instruction from the control unit 120.

In step S1210, the control unit 120 instructs the zoom control unit 182 to change the size of the projection videos. The zoom control unit 182 controls zooming of the zoom lens in accordance with the instruction from the control unit 120 and thus aligns the size of the projection videos.

In steps S1211 and S1212, as the size of the projection videos is changed by zoom control, the relative position of the projection videos is changed as well. Thus, the control unit 120 causes the image pickup unit 170 to pick up an image of each projection video again after zoom control, and determines again whether the edges of the projection videos are aligned with each other or not.

In steps S1213 and S1214, if the edges of the projection videos are not aligned, the control unit 120 executes processing similar to steps S1109 and S1110 shown in FIG. 11 and thus aligns the edges of the projection videos by lens shift. If the edges of the projection videos are aligned, these steps may be omitted.

As described above, in the eighth embodiment, the example of realizing the operation described in the third embodiment by software as a projector control program prescribing the operation of the control unit 120 is described.

Ninth Embodiment

In the ninth embodiment of the invention, another operation flow for realizing the operation of the projector 100 described in the third embodiment by software will be described. This software can be configured as a projector control program that prescribes the operation of the control unit 120.

Hereinafter, the operation flow of the projector control program according to the ninth embodiment will be described.

Figure 13:
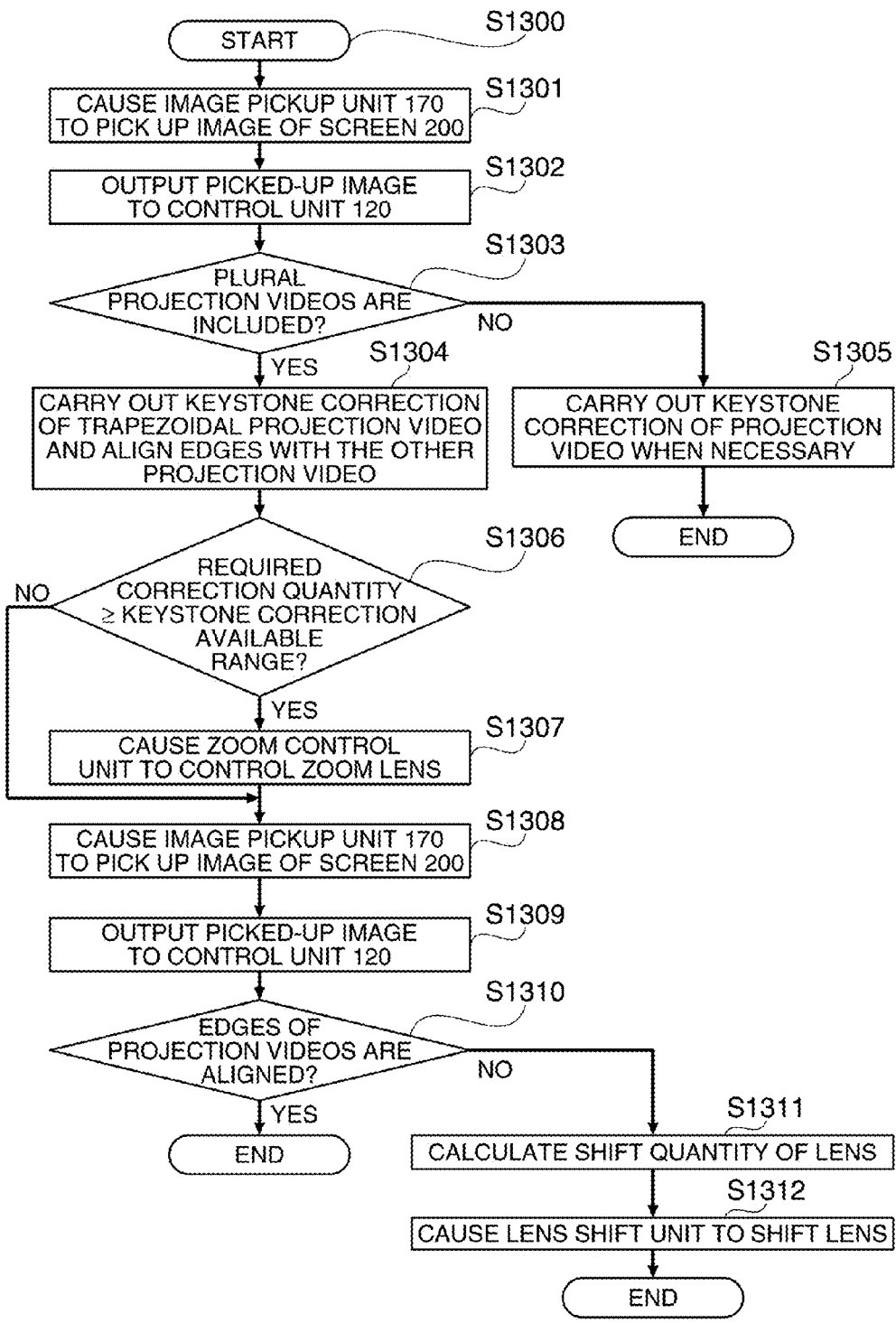
FIG. 13 shows an operation flow of a projector control program according to a ninth embodiment.

FIG. 13 shows the operation flow of the projector control program according to the ninth embodiment. Each step in FIG. 13 will now be described.

Steps S1300 to S1305 are similar to steps S1200 to S1205 shown in FIG. 12.

In step S1306, the control unit 120 determines whether the edges of the projection videos are successfully aligned with each other by keystone correction executed by the keystone correction unit 131 in step S1304. This is equivalent to determination as to whether the video range in the projection video can be corrected by keystone correction falls within a required correction quantity range in order to align the edges of the projection videos.

If it falls within the range, the processing goes to step S1308. If not, the processing goes to step S1307.

In this step, a required zoom quantity is calculated in advance in accordance with the keystone correction available range. Either the control unit 120 or the zoom control unit 182 can calculate the zoom quantity.

In step S1307, the control unit 120 causes the zoom control unit 182 to control the zoom lens in order to compensate for the amount that cannot be corrected within the keystone correction range.

Steps S1308 to S1312 are similar to steps S1106 to S1110 shown in FIG. 11.

As described above, in the ninth embodiment, the other example of realizing the operation described in the third embodiment by software as a projector control program prescribing the operation of the control unit 120 is described.

Keystone correction and zooming can be said to have similar functions in that the size of projection videos can be varied.

Thus, in an exemplary operation according to the ninth embodiment, keystone correction and zoom control are integrally carried out, and after this processing is finished, the image pickup unit 170 is caused to pick up an image of the screen 200 and the necessity of left shift is determined.

Thus, a small number of processing suffices from the image pickup by the image pickup unit 170 to the determination as to whether the edges are aligned or not. This is advantageous in terms of processing time.

Tenth Embodiment

The projector control programs described in the sixth to ninth embodiment can be stored in information storage media such as CD, DVD, flash memory, and other storage devices.

For example, for maintenance of the projector 100, the user can bring an information storage medium in which the projector control programs described in the sixth to ninth embodiments are stored, and the user can replace the control program in the projector by the control programs stored in the information storage medium.

Thus, simply by updating software, a projector having an image pickup unit can be provided with the functions similar to those of the projector according to the invention.

What is claimed is:

1. A projector comprising:
   a projection unit configured to project a video based on a video signal;

an image pickup unit configured to pick up an image of a projection video projected by the projection unit and output the picked-up image;

a control unit configured to determine a projection video projected by an other projector based on the picked-up image received from the image pickup unit; and a keystone correction unit configured to carry out keystone correction of the video signal so that the projection video projected by the projection unit is aligned with the projection video projected by the other projector.

2. The projector according to claim 1, wherein the keystone correction unit carries out the keystone correction of the video signal so that at least one of the edges of the projection video projected by the projection unit is aligned with one of the edges of the projection video projected by the other projector.

3. The projector according to claim 1, wherein the keystone correction unit further adjusts a size of the projection video projected by the projection unit in carrying out the keystone correction of the video signal.

4. The projector according to claim 1, further comprising a lens shift unit configured to shift a lens provided in the projection unit and thereby change a projection position of the projection video projected by the projection unit, wherein the lens shift unit changes the projection position of the projection video projected by the projection unit so that the projection video projected by the projection unit is aligned with the projection video projected by the other projector.

5. The projector according to claim 1, further comprising a zoom control unit configured to control a focal length of a zoom lens provided in the projection unit and configured to have a variable focal length, wherein the zoom control unit changes the focal length of the zoom lens so that the projection video projected by the projection unit is aligned with the projection video projected by the other projector.

6. The projector according to claim 1, wherein the projection unit and/or the other projector projects a video pattern unique to each of the projectors, the image pickup unit picks up, together with the video pattern, the image of the projection video and outputs the picked-up image to the control unit, the control unit determines the projection video projected by the projection unit and the projection video projected by the other projector, and the keystone correction unit carries out keystone correction of the video signal so that a positional relation between the projection video projected by the projection unit and the projection video projected by the other projector coincides with a predetermined positional relation with reference to the video pattern.

7. A projector control method for controlling a projector which projects a video based on a video signal, the control method comprising:

picking up an image of a projection video projected by the projector and outputting the picked-up image;

determining a projection video projected by an other projector based on the picked-up image; and carrying out keystone correction of the video signal so that the projection video projected by the projector is aligned with the projection video projected by the other projector.

8. A projector control method for controlling a projector comprising a keystone correction unit configured to carry out keystone correction of a video signal, a projection unit configured to project a video based on the video signal, and an image pickup unit configured to pick up an image of an image pickup object, the method comprising:

causing the image pickup unit to pick up an image of a projection video projected by the projection unit and to output the picked-up image;

determining a projection video projected by an other projector based on the picked-up image received from the image pick up unit; and causing the keystone correction unit to carry out keystone correction of the video signal so that the projection video projected by the projection unit is aligned with the projection video projected by the other projector.

* * * * *